Patented Aug. 11, 1931

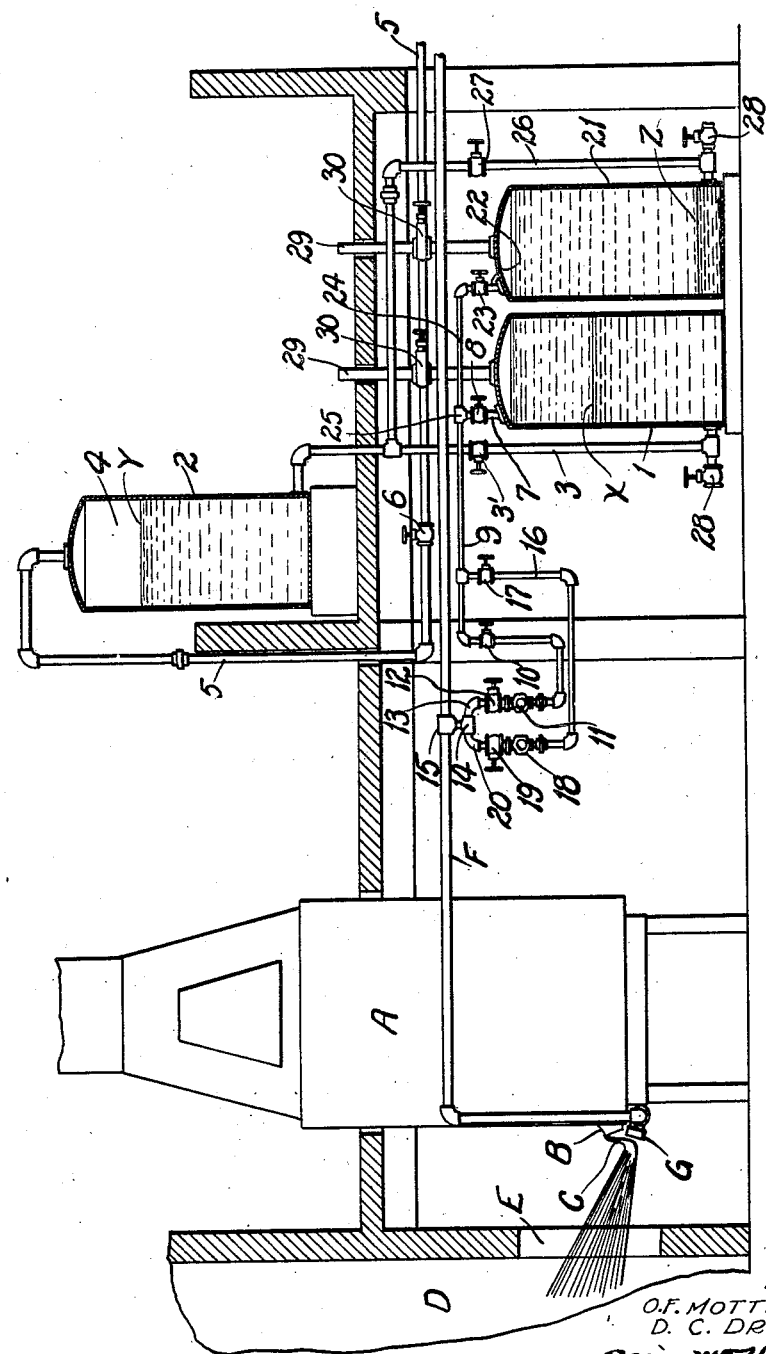

1,818,346

UNITED STATES PATENT OFFICE

OLIVER F. MOTTWEILER AND DANIEL C. DRILL, OF ALEXANDRIA, INDIANA, ASSIGNORS TO GENERAL INSULATING AND MANUFACTURING COMPANY, OF ALEXANDRIA, INDIANA, A CORPORATION OF INDIANA

METHODS OF AND APPARATUS FOR TREATING INSULATING MATERIALS

Application filed November 25, 1927. Serial No. 235,555.

This invention relates generally to methods of and apparatus for treating insulating materials, and particularly to an improved method and apparatus whereby rock wool, mineral wool, and similar insulating materials may be treated with a liquid to render said insulating material waterproof and also to give to said insulating material additional stiffness and body.

Prior to this invention, attempts were made to treat rock wool, mineral wool, and similar insulating materials with liquids to render same waterproof and to give additional body thereto, but these attempts did not result in success in that all of the attempts with which we are familiar involved permitting the liquid waterproofing material to drip on the insulating material as it was being formed. The result of following this process was that instead of obtaining an even and uniform distribution of the liquid throughout the product, as was desired, the distribution of the liquid was spotty so that an excessive liquid was present at some points of the finished insulating material, while there was a deficiency or entire absence of liquid at other points of said insulating material.

So that a clear understanding of our invention may be had, it will probably be advisable at this point to describe very briefly the method which is followed in manufacturing rock wool, mineral wool and similar materials. In the case of rock wool, which is made by practically the same process employed in making mineral wool and other similar materials, hard silica rock, from which the insulating material is made, is subjected to a preliminary crushing and the crushed rock mixed with small quantities of special fusing rock and specially prepared coke is fed into a furnace. The temperature within the furnace is increased until it reaches 3000° F. or over, and at this temperature rock fed in at the top of the furnace will flow out at the bottom of the furnace in a molten mass of lava-like substance, said molten mass flowing in a stream approximately one-half of an inch in diameter directly in front of a powerful shredding or blowing device. From the shredding or blowing device a powerful jet or blast of steam or other fluid is directed against the stream of molten lava-like substance, and said substance is blown into an adjacent cooling chamber in the form of fleece-like fibers which, in bulk, produce material closely resembling cotton or wool.

Heretofore, as already stated, when it was desired to treat the insulating material so produced with a waterproofing liquid, the waterproofing liquid was caused to drip on the material immediately after the blast of fluid had shredded it and before it entered the cooling chamber. This arrangement proved unsuccessful and in accordance with the present invention, the waterproofing liquid is mixed with the steam or other fluid ejected from the shredding device so that the jet or blast which strikes the stream of lava-like substance is composed of steam or other fluid and waterproofing liquid. The result of this arrangement is that the waterproofing liquid is evenly and uniformly distributed throughout the product and the objectionable spotty condition of the insulating material is eliminated.

The drawing illustrates one embodiment of the apparatus which is employed in following out our improved method.

In the drawing, A designates the furnace of the apparatus into which the rock to be melted is introduced at the top thereof, and B designates the outlet of the furnace from which the molten rock flows in a stream, as designated at the point indicated by the reference character C. D designates the cooling chamber of the apparatus, a wall of which is provided with an aperture E through which, as will subsequently appear herein, the cotton or wool-like insulating material is blown. F designates a steam or other fluid pipe through which live steam or other fluid is conducted to a shredding or blowing device G from which a powerful jet or blast of steam or other fluid is directed against the stream of substance flowing from the outlet B of the furnace, which stream of substance drops directly before the shredding or blowing device G.

Thus far, the apparatus described is what has been employed heretofore for making rock wool, the resultant product being a white untreated material and we will now describe the additional apparatus which is employed in treating rock wool or similar material in accordance with our invention.

1 designates a suitable receptacle in which an amount of liquid is contained. The lower portion of the receptacle 1 up to the line X in the drawing is filled with water or other liquid under pressure, and the upper portion of said receptacle above the water line X is filled with waterproofing liquid with which the insulating material is to be treated. The waterproofing liquid is made up largely of oil, said liquid preferably comprising a mixture of engine oil and paraffin, and, therefore, the waterproofing liquid and water within the receptacle 1 will not mix and the waterproofing liquid will remain in a position above the water.

Arranged in an elevated position with respect to the receptacle 1 is a second receptacle 2 which is connected to the receptacle 1 by a conductor 3 provided with a valve 3' by means of which passage of fluid through said conductor may be controlled. The receptacle 2 contains a body of water or other suitable liquid the level of which is so located that a space is provided in the upper portion of the receptacle which is free from water, the level of the water in the receptacle 2 being indicated by the line designated by the reference character Y. 5 designates a conductor for steam or other suitable fluid which communicates with the interior of the receptacle 2 at the top thereof, said conductor being provided with a valve 6 by the operation of which passage of fluid through said conductor may be controlled. The conductor 5 is in communication with a suitable source of supply of steam or other fluid and it is obvious that the discharge of pressure into the receptacle 2 will place the water therein under pressure. It is likewise plain because the interior of the receptacle 2 is in communication with the interior of the receptacle 1 by virtue of the conductor 3, that the liquid within said receptacle 1 will be under pressure also.

Located at the top of the receptacle 1 is an outlet conductor 7 provided with a valve 8 to control the passage of liquid therethrough. The outlet conductor 7 is in communication with a conductor 9 which is provided with a valve 10, and said conductor 9, which is provided with a downwardly extended and approximately U-shaped portion, has associated with it a fitting 11 having a sight opening closed by a transparent element through which the passage of liquid through said conductor may be observed. Located adjacent to the fitting 11 in the conductor 9 is a valve 12 for controlling the passage of liquid through that portion of the conductor, and 13, 14 and 15 designate fittings by means of which the interior of the conductor 9 is placed in communication with the interior of the fluid conductor F. It is obvious, in view of the arrangement of conductors and fittings just described, that the interior of the receptacle 1 is in communication with the interior of the fluid conductor F and that liquid within said receptacle 1 may be introduced into said fluid conductor.

16 designates a conductor which is connected to and communicates with the conductor 9 by means of a suitable fitting. The conductor 16 is provided with a valve 17 and said conductor is extended downwardly in approximately U-shaped form and is provided with a fitting 18 having a sight opening which is closed by a transparent element whereby the passage of fluid through said conductor may be observed. Also, the conductor 16 is provided with a valve 19 for controlling the passage of fluid through the adjacent portion of the conductor, and said conductor is connected to and is arranged in communication with the fluid conductor F through the instrumentality of a fitting 20 which is connected to the fitting 14 already referred to herein.

Located in the drawing adjacent to the receptacle 1 is a third receptacle 21 in which is contained at the bottom thereof a relatively small body of water or other suitable liquid, the level of which is indicated by the line designated by the reference character Z. The upper portion of the receptacle 21 is filled with waterproofing liquid and arranged at the top of said receptacle 21 and in communication with the interior thereof is an outlet conductor 22 provided with a valve 23. The outlet conductor 22 is arranged in communication with a conductor 24 which, in turn, communicates with the conductor 9 through the instrumentality of the fitting 25, whereby the contents of the receptacle 21 may be caused to flow through the conductors 22, 24 and 9 and through the associated fittings into the interior of the fluid conductor F.

The interior of the receptacle 21 is in communication with the interior of the receptacle 2 through the instrumentality of a conductor 26 which is provided with a valve 27 and is connected to the conductor 3 at a point between the receptacle 2 and the valve 3'. In view of this arrangement, it is plain that the pressure within the receptacle 2 will be transmitted to the liquid within the receptacle 21 so as to cause said liquid to be discharged from said receptacle when the valve 23 is positioned to permit the discharge of liquid from said receptacle. The receptacles 1 and 21 are provided each with a valve 28 which may be operated to drain the associated receptacle, and also each of said receptacles is provided with an inlet conductor 29 provided with a valve 30 for controlling the passage of liquid therethrough, whereby liquid may be introduced into said receptacles.

In the operation of our improved apparatus and in accordance with our improved method, fluid from a suitable source of supply will be passed through the conductor F and will be ejected from the shredding or blowing device G as already described, to blow the molten lava-like substance flowing from the furnace outlet B through the aperture E in a form resembling cotton or wool. Because of the introduction of fluid pressure into the upper portion of the receptacle 2, the pressure exerted against the waterproofing liquid within the receptacle 1, which pressure tends to force said waterproofing liquid from said receptacle, will be approximately the same as the fluid pressure within the conductor F, and, therefore, the waterproofing liquid will pass into the fluid conductor F from either the conductor 9 or the conductor 16, or both of said conductors, and said waterproofing liquid will be carried to the shredding or blowing device G from which a mixture of steam or other suitable fluid and waterproofing liquid will be discharged. The result of this arrangement is that the waterproofing liquid will be evenly and uniformly distributed throughout the entire body of insulating material as it is being formed, whereby a uniformly treated product of uniform color will be produced.

The function of the dual feeding device between the receptacle 1 and the fluid conductor F is to allow the U-shaped portion of the conductor 9 or the conductor 16 to be cut off for cleaning or other purposes without rendering the apparatus inoperative. Also, the function of the receptacle 21 is to provide a pair of reservoirs for waterproofing liquid from either one of which waterproofing liquid may be drawn when the supply of waterproofing material in the associated reservoir has been exhausted, it being necessary merely to close the valves associated with one reservoir and open the valves associated with the other reservoir when it is desired to change the reservoir from which the waterproofing material is being drawn. In this manner, a reservoir is always available for use when the other reservoir is being drained and refilled.

When the fluid passing through the conductor 5 is steam, the condensation of said steam in the space 4 within the receptacle 2 will maintain a supply of water within said receptacle.

While we have described the liquid with which the insulating material is treated as waterproofing material, we do not wish to be limited to the use of liquid for this purpose and we desire that our invention be understood to contemplate the use of any liquid with which the insulating material may be treated for any purpose.

We claim:—

1. The herein described method of making insulating material which comprises reducing the substance from which said insulating material is formed to a molten condition, and directing forcibly against a stream of said molten substance a blast of fluid having commingled therewith a solution comprising amounts of oil and a stiffening agent.

2. The herein described method of making insulating material which comprises reducing the substance from which said insulating material is formed to a molten condition, and directing forcibly against a stream of said molten substance a blast of fluid having commingled therewith a solution comprising amounts of oil and paraffin.

3. The herein described method of making insulating material which comprises reducing the substance from which said insulating material is formed to a molten condition, and directing forcibly against a stream of said molten substance a blast of fluid having commingled therewith a stiffening agent in fluid form.

4. An apparatus for producing insulating material comprising a furnace in which the substance from which the insulating material is produced is reduced to a molten condition, a device for directing a blast of fluid against a stream of molten substance flowing from said furnace, a fluid conductor leading to said device, a reservoir containing a body of liquid treating agent, a pressure tank communicating with said reservoir to place the body of liquid treating agent therein under pressure, and a conductor for conducting said liquid treating agent from said reservoir to said device for admixture with the fluid ejected therefrom.

5. An apparatus for producing insulating material comprising a furnace in which the substance from which the insulating material is produced is reduced to a molten condition, a device for directing a blast of fluid against a stream of molten substance flowing from said furnace, a fluid conductor leading to said device, a reservoir containing a body of liquid treating agent, a pressure tank communicating with said reservoir to place the body of liquid treating agent therein under pressure, a conductor for conducting said liquid treating agent from said reservoir to said device for admixture with the fluid ejected therefrom, and an auxiliary container arranged in communication with said conductor for holding a reserve supply of liquid treating agent, said auxiliary container being in communication with said pressure tank whereby the reserve supply of liquid treating agent therein will be under pressure.

6. An apparatus for producing insulating material comprising a furnace in which the substance from which the insulating material is produced is reduced to a molten condition, a device for directing a blast of fluid against a stream of molten substance flowing from said furnace, a fluid conductor leading to said device, a pair of reservoirs each of which contains a body of liquid treating agent, means whereby pressure substantially equal to that producing said blast of fluid may be applied to and maintained on said liquid treating agent within said reservoir, and a pair of associated conductors either of which may be operated independently, or both simultaneously, to conduct liquid treating agent from said reservoir to said device for admixture with the fluid ejected therefrom.

In testimony whereof, we have hereunto set our hands.

OLIVER F. MOTTWEILER.
DANIEL C. DRILL.